US011702270B1

(12) United States Patent
Liao et al.

(10) Patent No.: US 11,702,270 B1
(45) Date of Patent: Jul. 18, 2023

(54) EXPANDABLE INSULATED FOOD CONTAINER (71) Applicant: Elanteam International Co., Ltd., Ningbo (CN)

(72) Inventors: Chi-Pao Liao, Aliso Viejo, CA (US); Yu He, Ningbo (CN)

(73) Assignee: Elanteam International Co., Ltd., Zhejiang (CN)

( * ) Notice: Subject to any disclaimer, the term of this patent is extended or adjusted under 35 U.S.C. 154(b) by 0 days.

(21) Appl. No.: 17/912,414

(22) PCT Filed: Mar. 19, 2021

(86) PCT No.: PCT/US2021/023357
§ 371 (c)(1),
(2) Date: Sep. 16, 2022

(87) PCT Pub. No.: WO2021/189022
PCT Pub. Date: Sep. 23, 2021

Related U.S. Application Data (60) Provisional application No. 62/992,074, filed on Mar. 19, 2020.

(51) Int. Cl.
B65D 81/38 (2006.01)
A45C 7/00 (2006.01)
(Continued)

(52) U.S. Cl.
CPC ........ B65D 81/3823 (2013.01); A45C 7/0027 (2013.01); B65D 21/086 (2013.01);
(Continued)

(58) Field of Classification Search
CPC ............ B65D 81/3823; B65D 81/3818; B65D 81/3816; B65D 81/3813; B65D 81/38; B65D 81/3825; B65D 21/086; B65D 21/08; B65D 43/14; B65D 43/16; A45C 7/00; A45C 7/0018; A45C 7/0027; A45C 7/0031; A45C 7/0036; A45C 11/20; A45C 2200/20
See application file for complete search history.

(56) References Cited

U.S. PATENT DOCUMENTS 5,403,095 A 4/1995 Melk
7,810,350 B2 10/2010 Shelton
(Continued)

FOREIGN PATENT DOCUMENTS

CN 205366375 U 7/2016
RU 29040 U1 4/2003

OTHER PUBLICATIONS

International Search Report for corresponding International Patent Application No. PCT/US2021/023357 dated Jul. 1, 2021.
(Continued)

Primary Examiner — Javier A Pagan
(74) Attorney, Agent, or Firm — Loza & Loza, LLP; Michael F. Fedrick (57) ABSTRACT A container assembly having an expandable insulated container and an expandable insert. The insert includes an open upper rigid portion having side panels and a lower rigid portion having side panels a bottom panel, and the upper and lower rigid portions are joined by a flexible medial portion.

15 Claims, 12 Drawing Sheets (51) Int. Cl.
*B65D 21/08* (2006.01)
*B65D 43/16* (2006.01)
*A45C 11/20* (2006.01)

(52) U.S. Cl.
CPC .............. *B65D 43/16* (2013.01); *A45C 11/20* (2013.01); *A45C 2200/20* (2013.01); *B65D 2525/28* (2013.01)

(56) References Cited

U.S. PATENT DOCUMENTS

| | | | |
|---|---|---|---|
| 7,815,069 | B1* | 10/2010 | Bellofatto .......... B65D 81/3886 220/666 |
| 7,841,207 | B2 | 11/2010 | Mogil et al. |
| 8,844,756 | B2 | 9/2014 | Beyburg |
| 9,462,874 | B1 | 10/2016 | Samuel |
| 10,138,048 | B2 | 11/2018 | Mitchell et al. |
| D842,048 | S | 3/2019 | Wells |
| 10,443,918 | B2 | 10/2019 | Li et al. |
| 2004/0035143 | A1* | 2/2004 | Mogil .................... A45C 13/02 383/110 |
| 2005/0072181 | A1* | 4/2005 | Mogil .................... A45C 11/20 62/457.7 |
| 2007/0028642 | A1* | 2/2007 | Glade .................... A61B 90/98 62/457.2 |
| 2007/0237432 | A1* | 10/2007 | Mogil .................. A45C 7/0077 383/38 |
| 2011/0182532 | A1* | 7/2011 | Baltus .................... A45C 13/02 383/109 |
| 2013/0233865 | A1* | 9/2013 | Hutchinson ............ A45C 11/20 220/592.2 |
| 2018/0127178 | A1* | 5/2018 | Bosio .................. B65D 81/3205 |
| 2020/0003474 | A1 | 1/2020 | Jennie |

OTHER PUBLICATIONS

International Written Opinion for corresponding International Patent Application No. PCT/US2021/023357 dated Jul. 1, 2021.

\* cited by examiner

Figure 12

EXPANDABLE INSULATED FOOD CONTAINER

CROSS-REFERENCE TO RELATED APPLICATIONS

This application is the U.S. national stage of International Patent Application No. PCT/US2021/023357, filed on Mar. 19, 2021 and entitled EXPANDABLE INSULATED FOOD CONTAINER, which claims the benefit of priority under 35 U.S.C. § 119(e) from U.S. Patent Application No. 62/992,074, filed on Mar. 19, 2020. The disclosures of the foregoing applications are incorporated herein by reference in their entirety.

INTRODUCTION/BACKGROUND

Portable containers for carrying heated or cooled items such as food or beverages provide the ability to prevent a change in the temperature of heated or cooled items over a period of time. Thermally insulated carriers for maintaining the temperature of food and beverages are often used to carry a lunch to be eaten at a school or workplace, or to carry food or beverages when attending sporting advents or any other activity in which refrigeration or heating is not easily accessible or maintainable.

Soft sided insulated carriers provide several advantages over hard sided containers, including lighter weight, greater portability, and greater comfort when transporting such containers. Soft sided carriers are typically constructed by placing a section of thermally insulating foam between two pieces of flexible fabric. However, soft sided carriers do not provide structural support or waterproofing which can be achieved with hard sided containers. Structural support may also be desired in order to protect the contents of the carrier from being crushed by impact or by loads placed on top of the carrier. Hard sided containers, however, maintain a fixed volume, and therefore lack the structural flexibility of soft sided containers, which can assume a smaller volume when not in use and/or when smaller items are placed inside such containers.

The reference numbers in the drawings designate the following components of the present appliance:

| | | |
|---|---|---|
| Container assembly | | 1 |
| Insulated carrier | | 100 |
| | flexible panels | 101 |
| | top panel | 102 |
| | bottom panel | 103 |
| | right side panel | 104 |
| | left side panel | 105 |
| | front panel | 106 |
| | rear panel | 107 |
| | outer surface | 108 |
| | inner surface | 109 |
| | upper opening | 110 |
| | interior space | 111 |
| | upper end | 112 |
| | lower end | 114 |
| | hinge | 115 |
| | right side | 124 |
| | left side | 125 |
| | front end | 126 |
| | back end | 127 |
| | outer panel layer | 131 |
| | inner panel layer | 132 |
| | attachment anchor | 133 |
| | handle | 134 |
| | handle right side | 136 |
| | handle left side | 137 |
| | handle reversible attachment | 139 |
| | panel top side | 142 |
| | panel bottom side | 143 |
| | panel right side | 144 |
| | panel left side | 145 |
| | flap | 150 |
| | flap proximal side | 152 |
| | flap distal side | 153 |
| | flap outer surface | 158 |
| | flap inner surface | 159 |
| | zipper | 160 |
| | zipper half | 161 |
| | zipper for container closure | 162 |
| | zipper for container expansion | 164 |
| Insert | | 200 |
| | interior space | 201 |
| | upper opening | 202 |
| | bottom side | 203 |
| | right side | 204 |
| | left side | 205 |
| | front side | 206 |
| | rear side | 207 |
| | outer surface | 208 |
| | inner surface | 209 |
| | upper end | 212 |
| | lower end | 214 |
| | rigid panel | 215 |
| upper rigid container portion | | 220 |
| | right side panel | 224 |
| | left side panel | 225 |
| | front panel | 226 |
| | rear panel | 227 |
| | upper end | 232 |
| | lower end | 234 |
| | peripheral lip | 235 |
| | concave retainer | 236 |
| lower rigid container portion | | 240 |
| | bottom panel | 243 |
| | right side panel | 244 |
| | left side panel | 245 |
| | front panel | 246 |
| | rear panel | 247 |
| | upper end | 252 |
| | lower end | 254 |

| | |
|---|---|
| flexible medial portion | 300 |
| outer surface | 308 |
| inner surface | 309 |
| upper end | 312 |
| lower end | 314 |

SUMMARY

The present container assembly includes an insulated container 100 and a semi-rigid insert 200. The insulated container has an upper opening 110, an outer surface 108, an inner surface 109, an upper end 112, a lower end 114, and an interior space 111, and is formed from one or more flexible panels 101. The flexible panels can be formed from any of a number of suitable materials known to the art, but in one embodiment can be nylon. The insulated container has at least a top panel 102, a bottom panel 103, and one or more side panels, and in one embodiment container is cuboid in shape and comprises a right side panel 104, a left side panel 105, a front panel 106, and a rear panel 107, with the top panel being hingedly connected to the rear panel. The insulated container can however be formed in any of a number of three-dimensional configurations, and in an alternative embodiment the side panel(s) can be cylindrical. The bottom panel and side panels of the insulated container are attached to each other in order to form the interior space 111, and the top panel is hingedly connected to at least one of the side panels at an upper end of the container. The top panel is also reversibly securable, such as with a zipper connector, to at least some of the remaining panels in order to close the container. The insulated container can further include a handle or an attachment anchor for a strap.

The container assembly further includes an insert 200 having an upper opening 202, an outer surface 208, an inner surface 209, an upper end 212, a lower end 214, and an interior space 201. The insert includes an upper rigid container portion 220 and a lower rigid container portion 240 which are formed from rigid materials such as acrylonitrile-butadiene-styrene (ABS) or polyethylene polymers, as well as a flexible panel 300 formed from flexible materials such as silicone or styrene-butadiene-styrene (SBS). The upper rigid container portion 220 has an upper end 232 and a lower end 234, and includes one or more rigid side panels 215. In one embodiment, the inner surface 209 of the rigid side panels 215 is formed to have concave surfaces in order to better secure drinks carried in the container assembly. The insert 200 further includes a lower rigid container portion 240 having an upper end 252 and a lower end 254 and includes one or more rigid side panels 215 and a rigid bottom panel 243. The bottom panel is attached to the lower ends of the one or more rigid side panels 215.

The insert 200 further includes a circumferential flexible panel 300 having an upper end 312 and a lower end 314 positioned between the upper rigid container portion 220 and the lower rigid container portion 240. The lower end of the panel 300 is attached to the upper end of the lower rigid container portion 240 and the upper end of the panel 300 is attached to the lower end of the upper rigid container portion 220, thereby forming the insert 200. Preferably, the panel 300 extends continuously between the upper rigid container portion 220 and the lower the rigid container portion 240, but in embodiments in which lighter weight is desired or in which a continuous wall is not necessary, the panel can comprise a plurality of panels, and/or can include openings.

In one embodiment, the insert is cuboid in shape, in which case the upper rigid container portion 220 includes a right side panel 224, a left side panel 225, a front panel 226, and a rear panel 227, and the lower rigid container portion 240 includes a right side panel 244, a left side panel 245, a front panel 246, and a rear panel 247.

The insert is configured to be placed through the upper opening 110 and contained within the interior space of the insulated container 100. In a first configuration of the insert, the lower ends of the panels of the upper rigid container portion are below the upper ends of the panels of lower rigid container portion. In this configuration, inner surfaces of the panels of the upper rigid container portion are preferably adjacent to the outer surfaces of the panels of the lower rigid container portion, i.e. the panels of the upper rigid container portion are outside the panels of the lower rigid container portion. In a second configuration of the insert, the lower ends of the panels of the upper rigid container portion are above the upper ends of the panels of lower rigid container portion, i.e. the panels of the upper rigid container portion are above the panels of the lower rigid container portion. The interior space 201 of the insert in the second configuration is greater in volume than the interior space of the insert in the first configuration.

The insulated container portion of the assembly can further include a zipper connector which extends peripherally around the outer surface of the insulated container. A first half of the zipper connector extends peripherally around a medial portion of the insulated container and a second half of the zipper connector extends peripherally around a lower end of the insulated container, and the first and second halves of the zipper connector can be connected to form a first configuration of the insulated container or disconnected in order to form a second configuration of the insulated container. The second configuration of the insulated container is able to contain the second configuration of the insert.

In a preferred embodiment, the insert has an outwardly extending circumferential lip on the upper end 232 of the upper rigid container portion 220. The peripheral lip 235 extends continuously around the periphery of the upper end 232 of the upper rigid container portion 220. Each of the flexible panels 101 in this embodiment also preferably comprises an outer layer and an inner layer, with the outer layer extending above the upper end of the inner layer. The peripheral lip in this case extends outwardly over and above the upper end of the inner layer, so that when the insulated container portion 100 is expanded and the side walls are extended upwardly, the upper end of the inner layer supports the insert in the expanded configuration.

DETAILED DESCRIPTION

Definitions

As used herein, the following terms and variations thereof have the meanings given below, unless a different meaning is clearly intended by the context in which such term is used.

"Approximately" and "about" refer to a measurement, distance, direction, or other measurement or property which is within 10% of the stated measurement or property.

"Collapsed" and "retracted" refer to a configuration in which an upper portion of the insert of the present container assembly is vertically closer to a lower portion of the insert as compared to an expanded configuration of the insert. "Expanded" refers to a configuration in which the upper portion of the insert of the present container assembly is vertically further from the lower portion of the insert as compared to a retracted or collapsed configuration of the insert.

"Cuboid" refers to a shape bounded by six quadrilateral faces, such as a standard lunch box.

"Hingedly" refers to a connection and/or attachment between two components, such as between two panels of the container assembly, that allows one component to bend, fold or rotate with respect to the other component.

"Horizontal" refers to a surface or orientation which is approximately parallel to a surface on which the present container assembly, carrier and/or insert is placed, in particular a bottom or lower part of the container assembly, carrier and/or insert. "Vertical" refers to a direction or orientation which is away from a horizontal orientation, preferably at approximately a 90° angle with respect to a horizontal orientation.

"Insulate" and "insulated," with respect to the panels of the present container, refers to a material which inhibits the passage of heat therethrough in order to slow a change in temperature of items contained inside the container, either to maintain the items at a relatively cooler temperature compared to the temperature outside the container or to maintain the items at a relatively warmer temperature compared to the temperature outside the container.

"Lip" refers to an outwardly extending edge or flange which extends around the periphery of a component.

"Rigid" and "flexible" have their ordinary meanings for items for personal or household use. "Rigid" generally refers to a material, such as a polymer plastic material, which resists deformation when forces associated with personal or household use, such as for use in transporting food or beverage items, are applied to it. Materials having a flexural modulus (modulus of elasticity) of ABS (acrylonitrile-butadiene-styrene) or polyethylene plastic can be used, for example, materials with a modulus of between 0.5 GPa and 3 GPa or more, or between 1 GPa and 2.5 GPa. "Flexible" refers to a material which elastically bends or deforms when forces associated with personal or household use are applied to it.

The term "soft" as applied to the panels of a soft sided insulated container refers to a flexible material which can be bent or folded in the manner of cloth fabric without damaging the material. This is in contrast to rigid materials such as molded ABS or polyethylene plastic.

The terms "above," "below," "between," "higher," "lower" "upper," "lower," "top," "bottom," "right," "left," "vertical," "horizontal," and other terms of relative position or orientation used herein refer to a relative position of one portion or component of the present device compared to another component or portion.

The term "comprise" and variations of the term, such as "comprising" and "comprises," are not intended to exclude other additives, components, integers or steps. The terms "a," "an," and "the" and similar referents used herein are to be construed to cover both the singular and the plural unless their usage in context indicates otherwise. Ranges which are described as being "between" two values include the indicated values.

Insulated Container

The present container assembly 1 provides an expandable insulated container 100 and an expandable insert 200 having both rigid and flexible components. The insulated container 100, which can be a cooler or lunch container, comprises an insulated and preferably soft-sided body having an outer surface 108, inner surface 109, upper opening 110, and insulated interior space 111, whose inner surface 109 is bounded by a plurality of panels 101, including at least a top panel 102, a bottom panel 103, and one or more side panels. The container 100 can have a variety of three-dimensional configurations, but in one embodiment can be in the form of a cuboid as depicted in the illustrated embodiments, for example. In this embodiment, the insulated container 100 includes a top panel 102, bottom panel 103, right side panel 104, left side panel 105, front panel 106, and rear panel 107. The respective right sides and left sides of each of the right side panel 104, left side panel 105, front panel 106, and rear panel 107 are joined to each other to form a peripheral enclosure, and the bottom sides of the right side panel 104, left side panel 105, front panel 106, and rear panel 107 are joined to the bottom panel 103. In this context, the joining of panels can refer to panels which are integrally formed, such as from the same sheet of material, or to panels which are securely attached to each other. Such secure attachment can be accomplished in ways known to the art, such as through sewn stitching, polymer welding (e.g., RF welding, microwave welding, or induction welding), or the use of adhesive.

Figure 4:
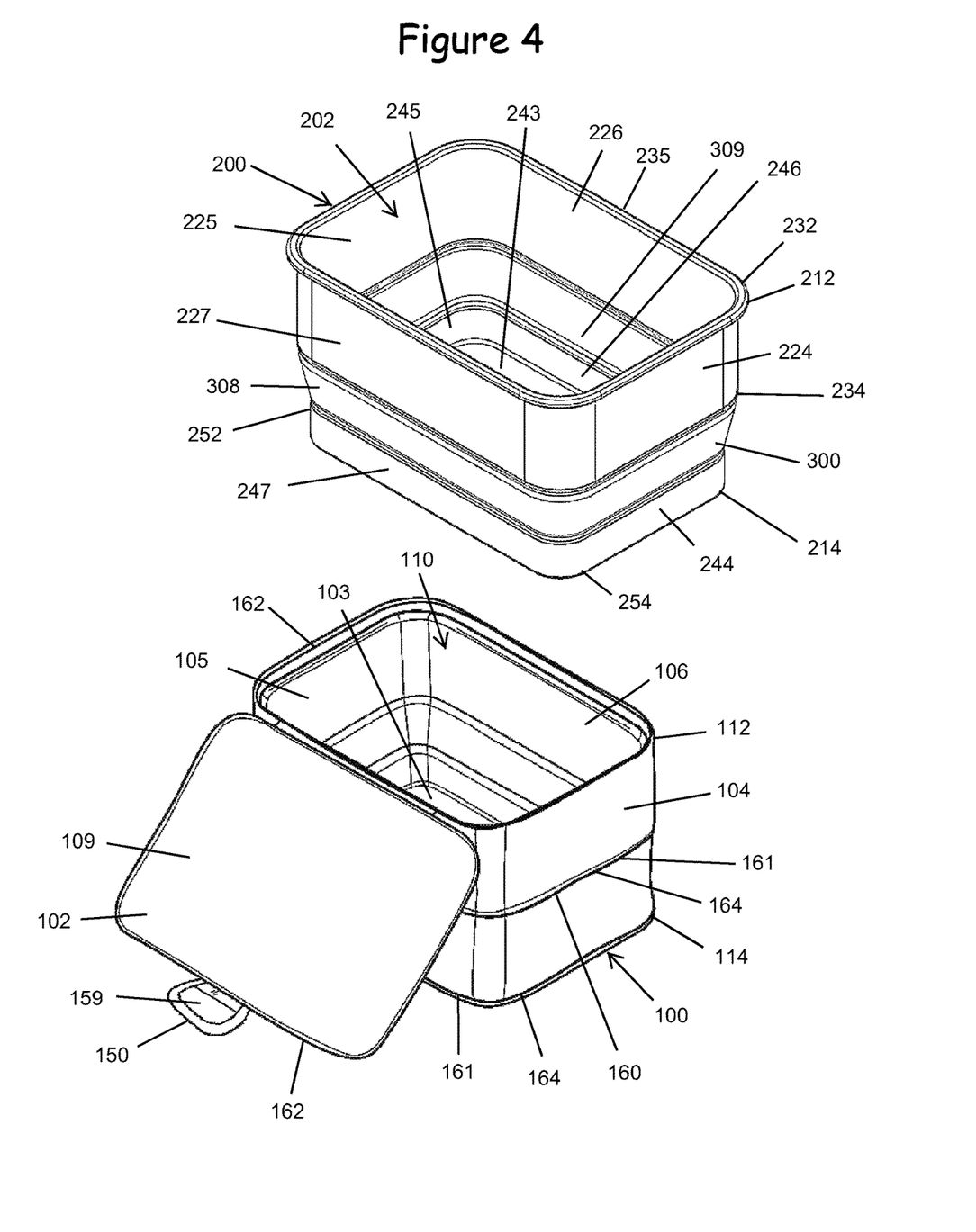
FIG. 4 is an exploded perspective view of the container assembly of FIG. 1 in an expanded configuration.
Figure 5:
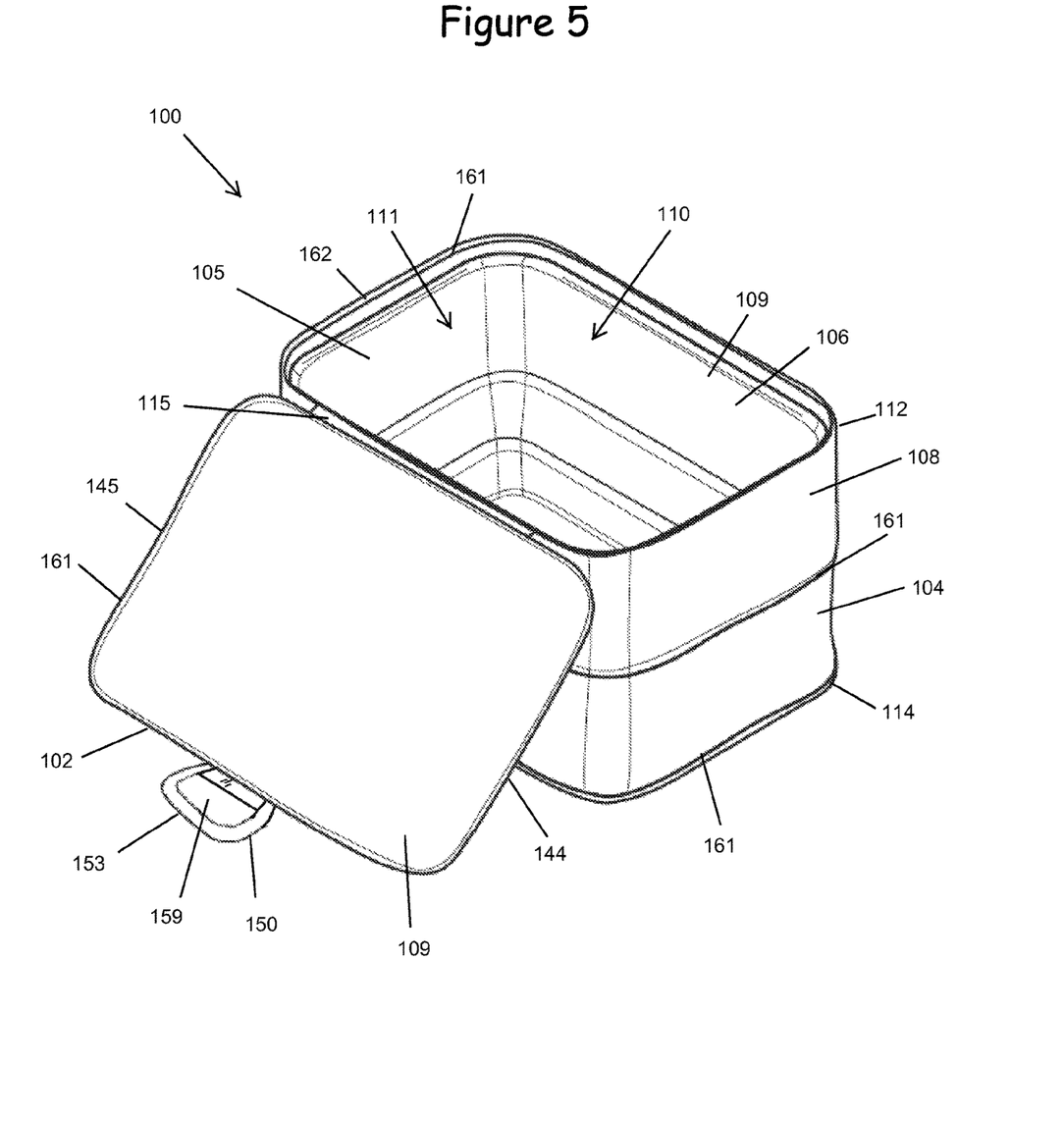
FIG. 5 is a perspective view of the assembled container assembly of FIG. 1 in an expanded configuration.
Figure 6:
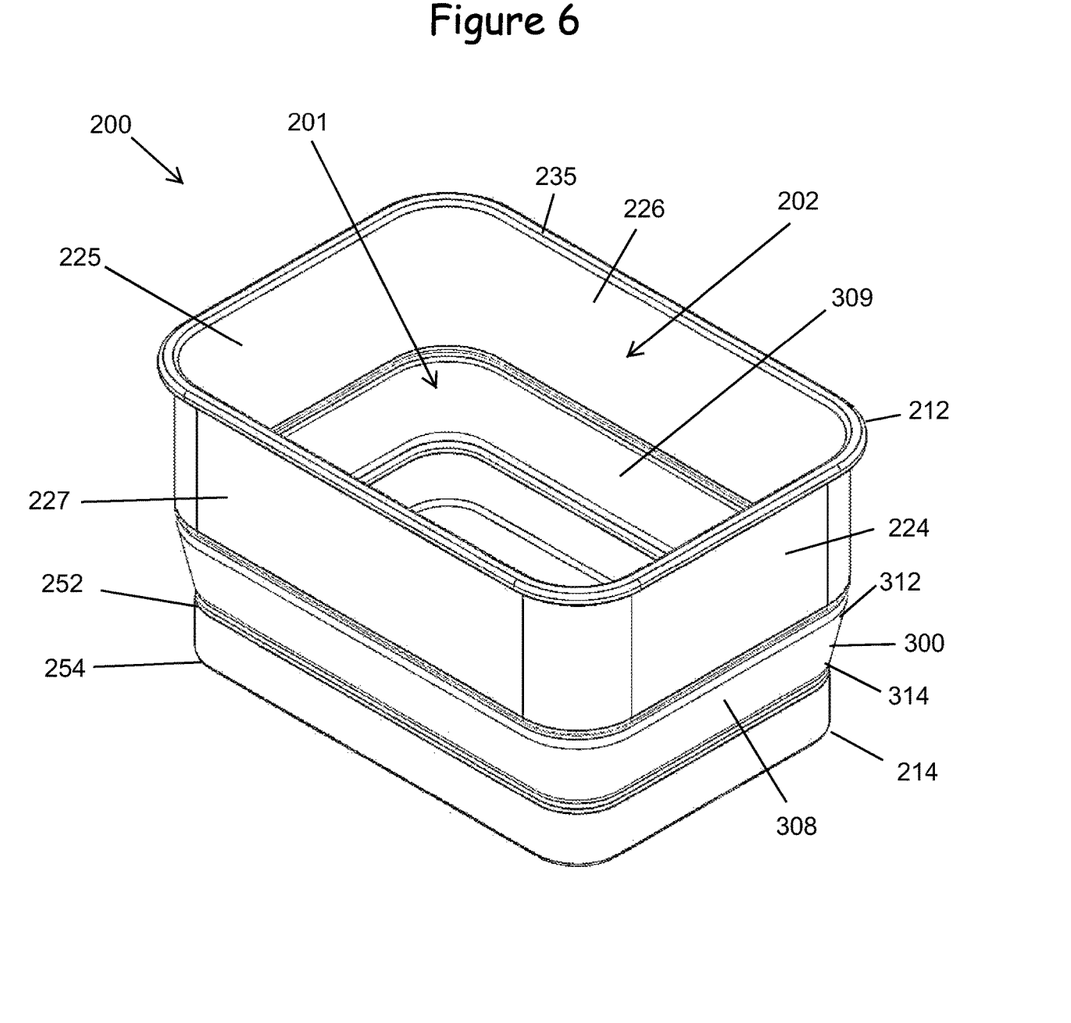
FIG. 6 is a perspective view of the insert of the container assembly of FIG. 1 in an expanded configuration.
Figure 7:
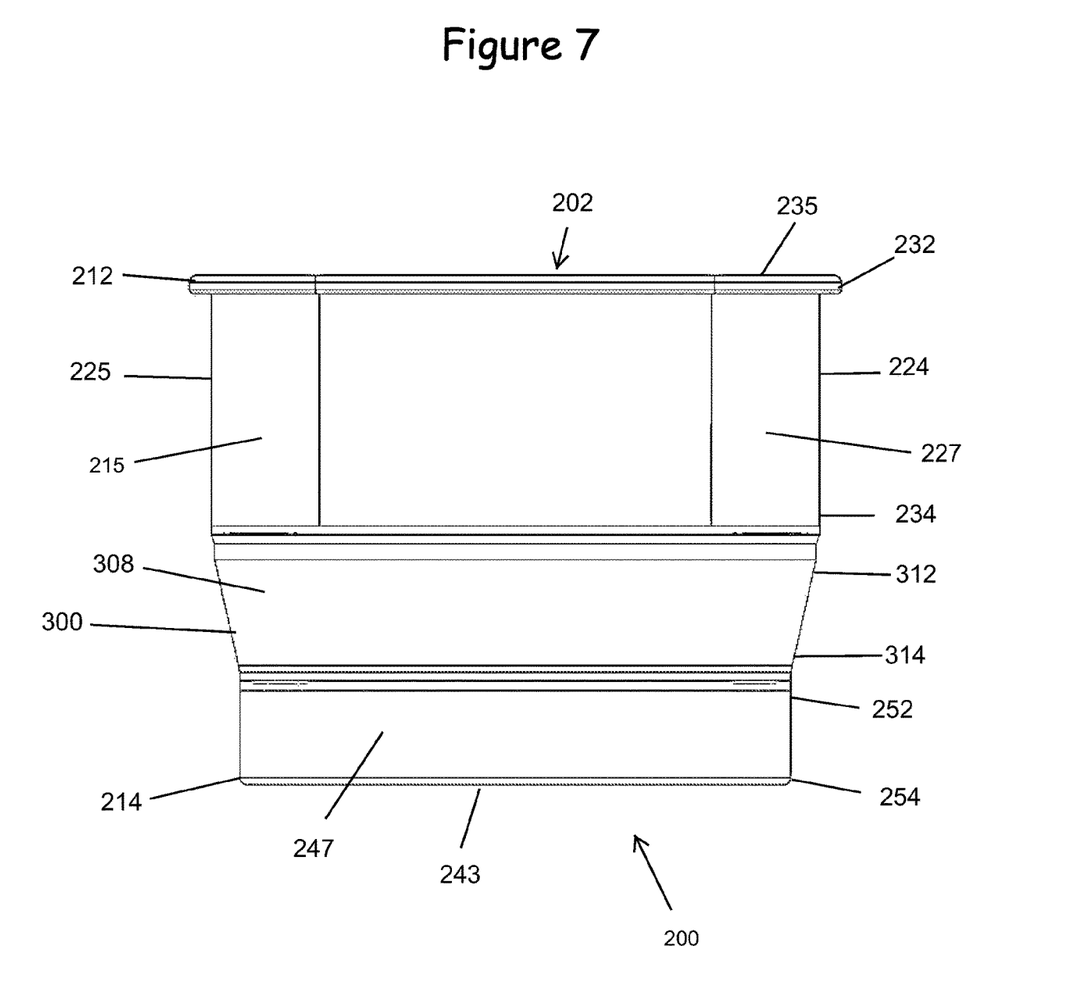
FIG. 7 is a side elevation view of the insert of the container assembly of FIG. 1 in an expanded configuration.
Figure 8:
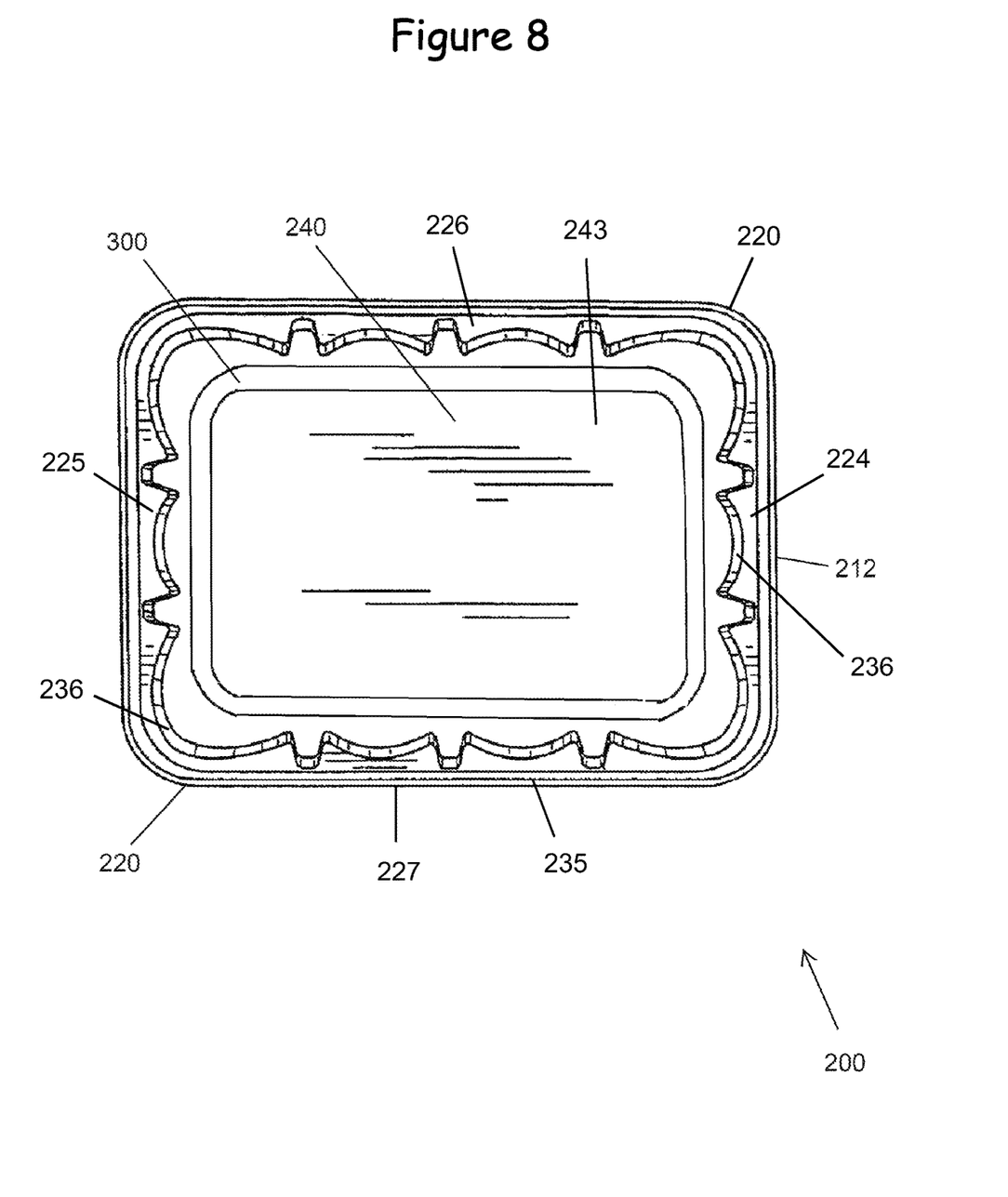
FIG. 8 is a top plan view of an alternative embodiment of an insert for the present container assembly.
Figure 9:
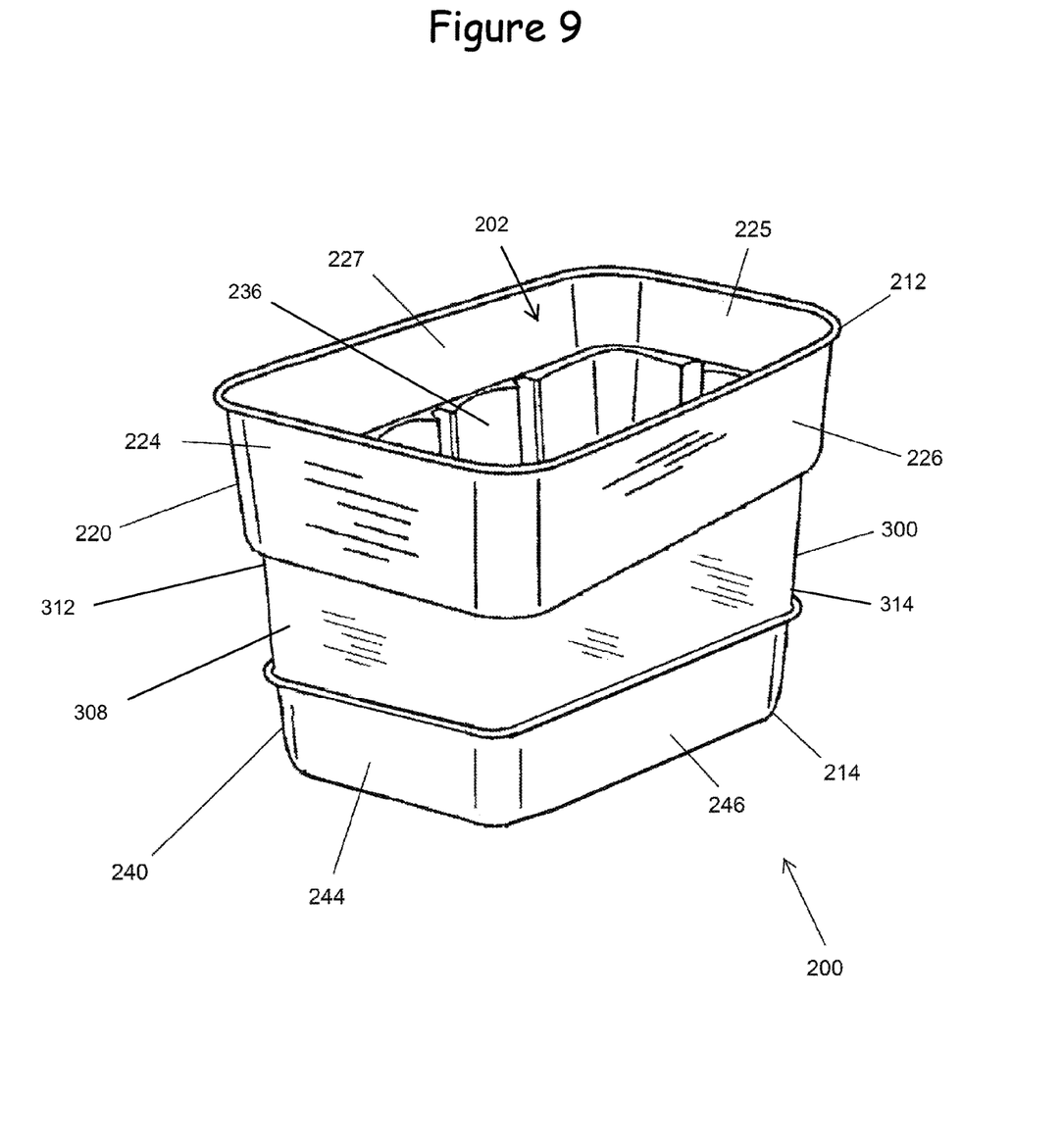
FIG. 9 is a perspective view of the insert of FIG. 8 in an expanded configuration.
Figure 10:
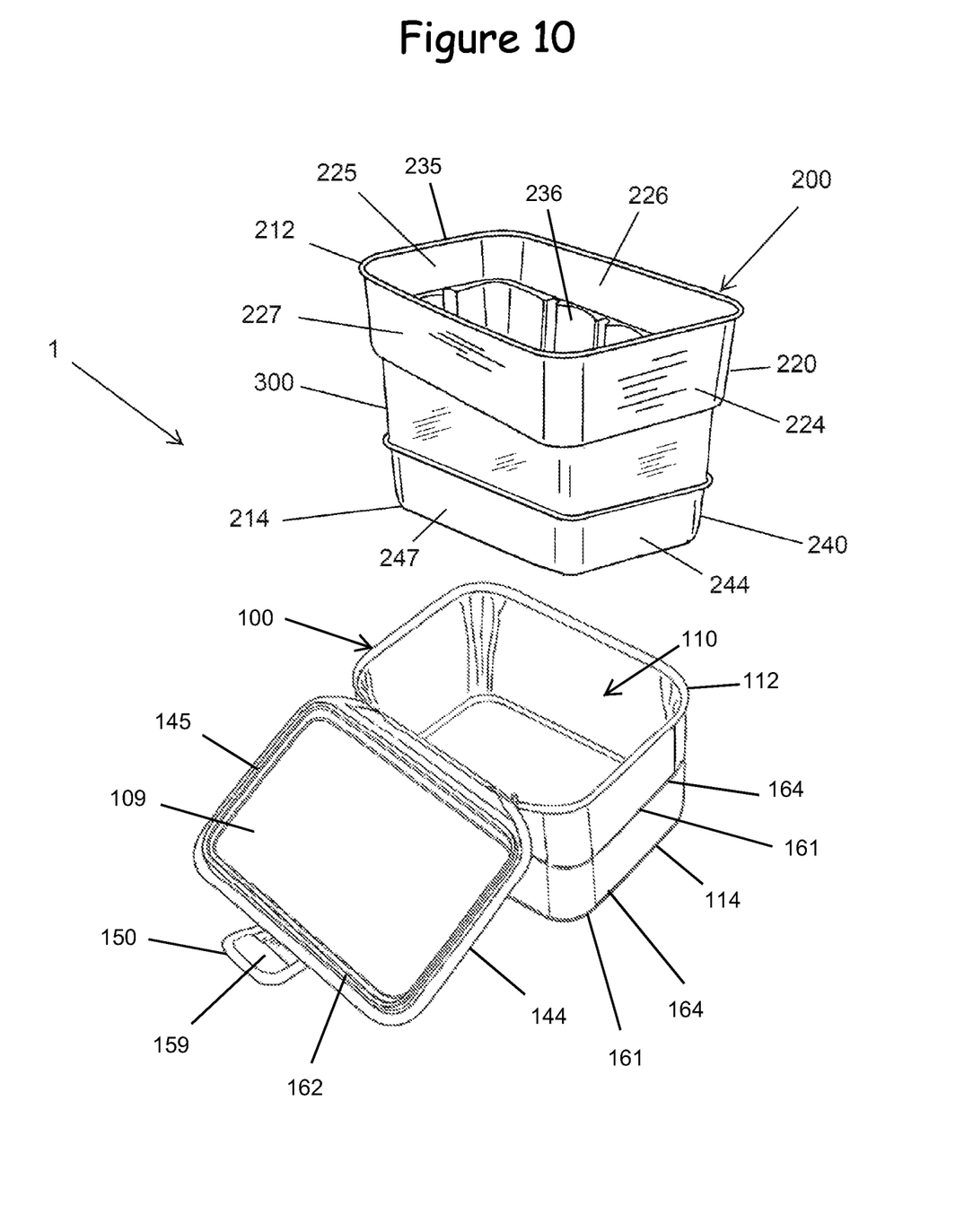
FIG. 10 is an exploded perspective view of a container assembly with the insert of FIG. 8 in an expanded configuration

At least one portion of the upper end of the side walls, such as the upper end of the right side panel 104, left side panel 105, front panel 106, and/or rear panel 107, is preferably hingedly secured to the top panel 102 in order to open the container 100. The hinge 115 can be a piece of flexible material as described herein, or can be implemented in other ways known to the art. The upper ends 112 of the remaining panel or panels which are not securely attached to the top panel 102 can be reversibly secured at their upper ends to the top panel 102, such as with a zipper connector 160, hook-and-loop fastener, or in other ways known to the art. As shown for example in FIGS. 4 and 5, a zipper for container closure 162 comprises a first zipper half 161 attached at the upper end 112 of the insulated container 100 around the periphery of the upper end and a second zipper half 161 attached to the periphery of the top panel 102 which is configured to mate with the first zipper half.

Figure 1:
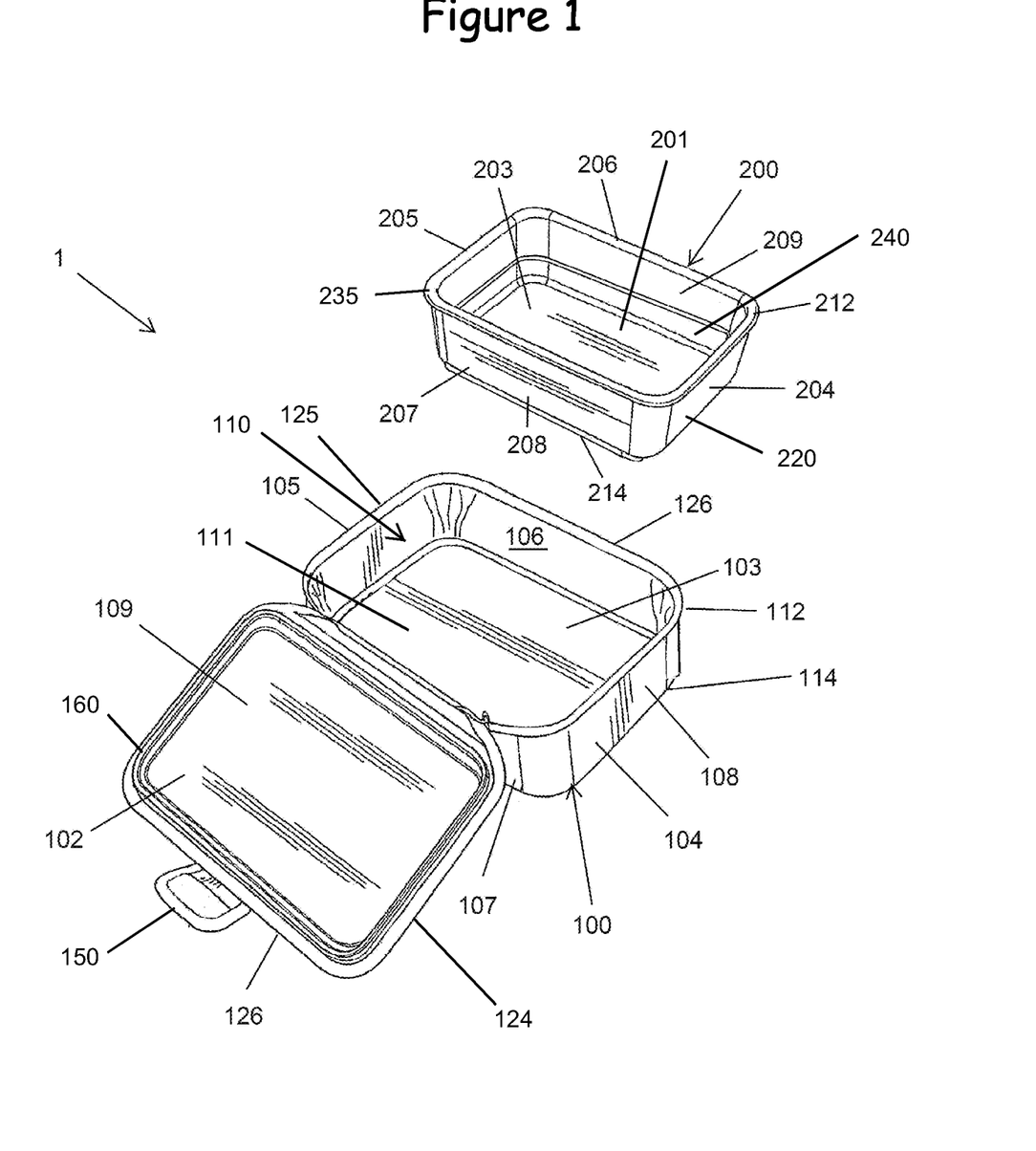
FIG. 1 is an exploded perspective view of a container assembly, including an insulated carrier and an insert in a collapsed configuration.
Figure 2:
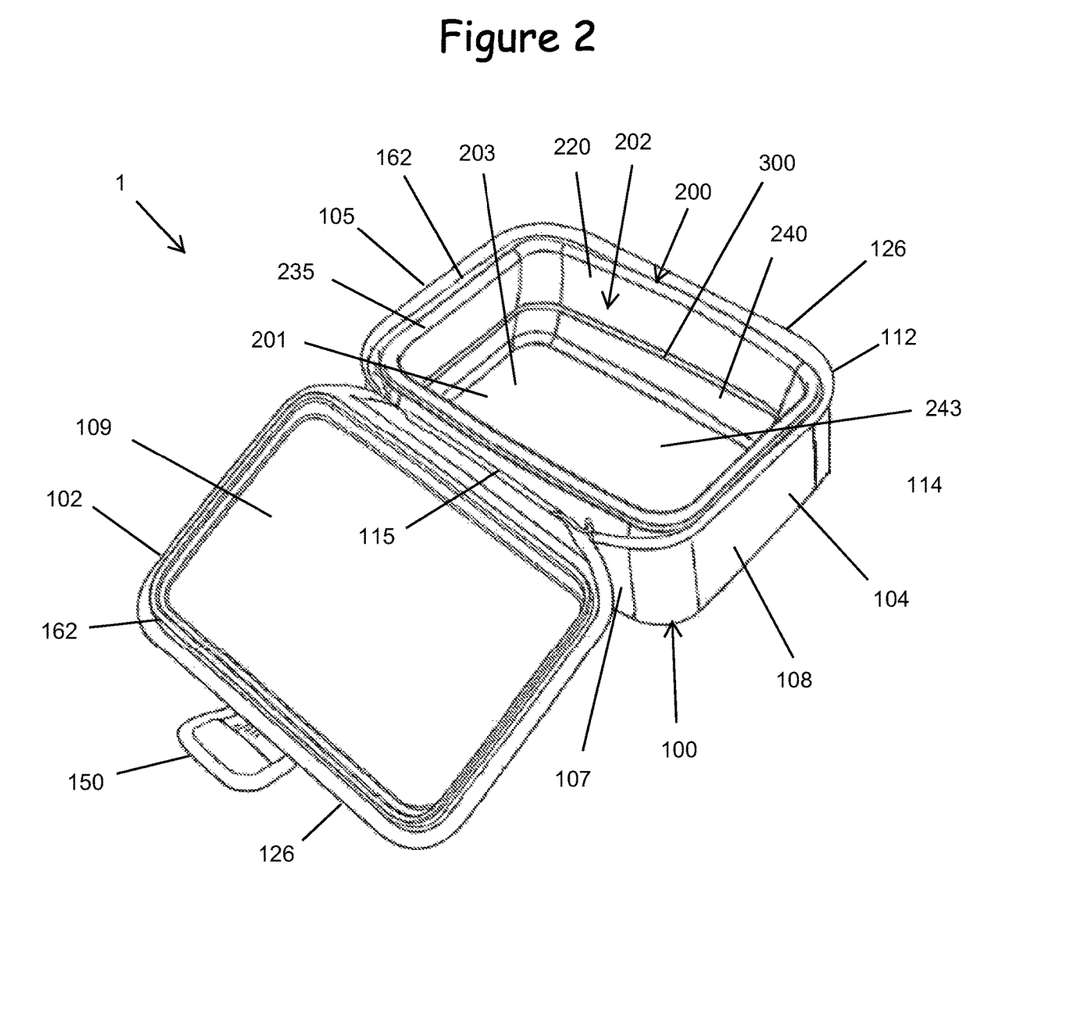
FIG. 2 is a perspective view of the assembled container assembly of FIG. 1 in a collapsed configuration.
Figure 3:
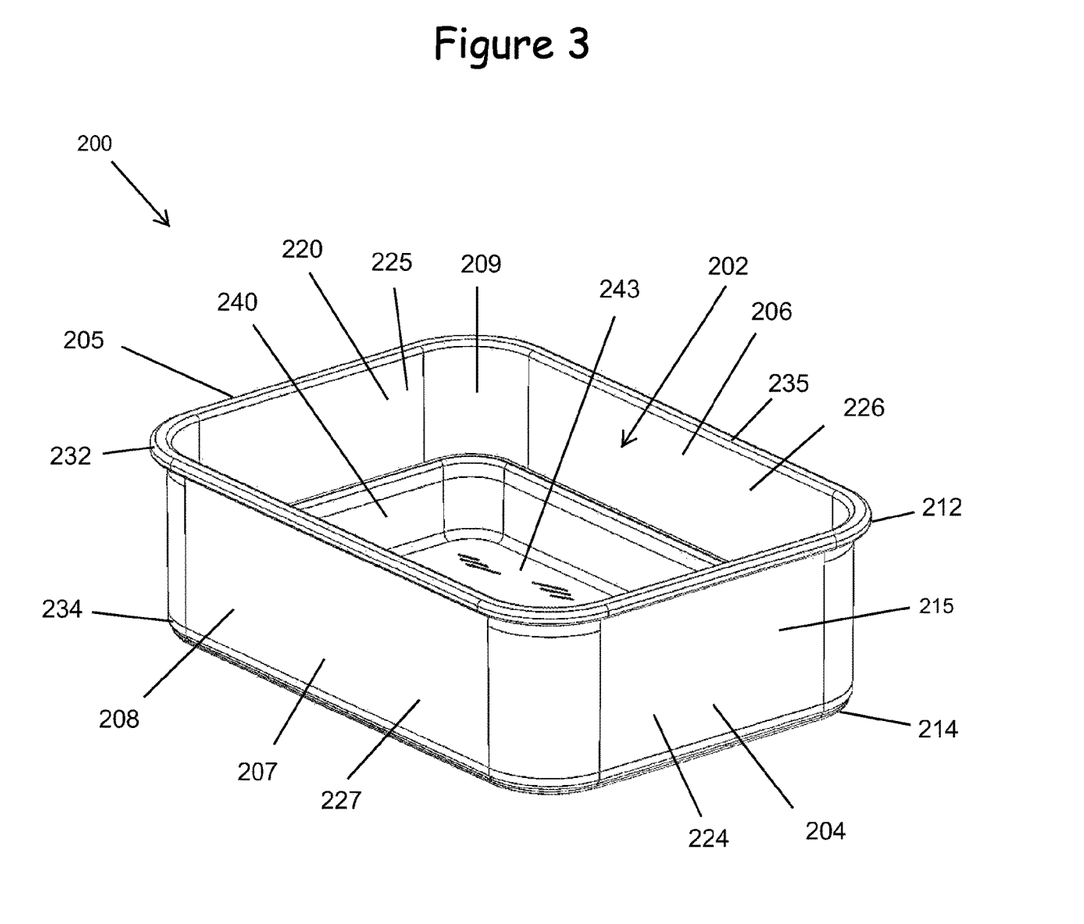
FIG. 3 is a perspective view of the insert of the container assembly of FIG. 1.

One feature of the present container assembly is its ability to take on two configurations, an expanded configuration (as seen in FIGS. 4-7) having a relatively larger internal volume and a retracted configuration (seen in FIGS. 1-3) having a relatively smaller internal volume. In order for the insulated container portion of the container assembly to take on these two configurations, a zipper for container expansion 164 is provided. The expansion zipper 164 extends peripherally around the outer surface of the insulated container, with a first half of the zipper connector 161 extending peripherally around a medial portion of the insulated container and a second half of the zipper connector 161 extending peripherally around a lower end of the insulated container. These first and second halves of the zipper connector can be connected, thereby joining a medial portion of the side panels with the lower ends of the side panels, effectively decreasing the height of the side panels and consequently decreasing the volume of the interior space of the insulated container. In order to increase the volume of the interior space of the insulated container, the expansion zipper 164 is disconnected. Fasteners and other means known to the art for connecting a lower portion of the container walls to a medial portion can also be used. In order to accomplish the foregoing change in configuration and interior volume of the insulated container 100, the panels 101 of the container 100 are preferably flexible, thereby allowing side panels (104, 105, 106, 107) to be folded inwardly or together in a manner that reduces the interior volume as well as generally reducing the amount of exterior space that the container takes up.

The panels of the insulated container have insulating properties, in order to reduce the loss or gain of heat with the outside environment of food, beverages, or other items within the container. The panels 101 can be formed from a single material having insulating properties, or can be fashioned from layers of material which together have insulating properties, for example from an outer panel layer 131, a layer of insulation, and an inner panel layer 132. In such embodiments the internal and external layers can be a woven fabric such as a polyester/cotton fabric, a nylon sheet, or other membrane, for example, and the layer of insulation can be formed from one or more insulating components. Materials which are resistant to the passage of moisture are preferred in some embodiments. The insulating layer is typically a flexible or resilient layer, and can be made from any one of a number of suitable known insulating materials. An example of such a material would be a high density polyurethane or EVA foam.

Figure 11:
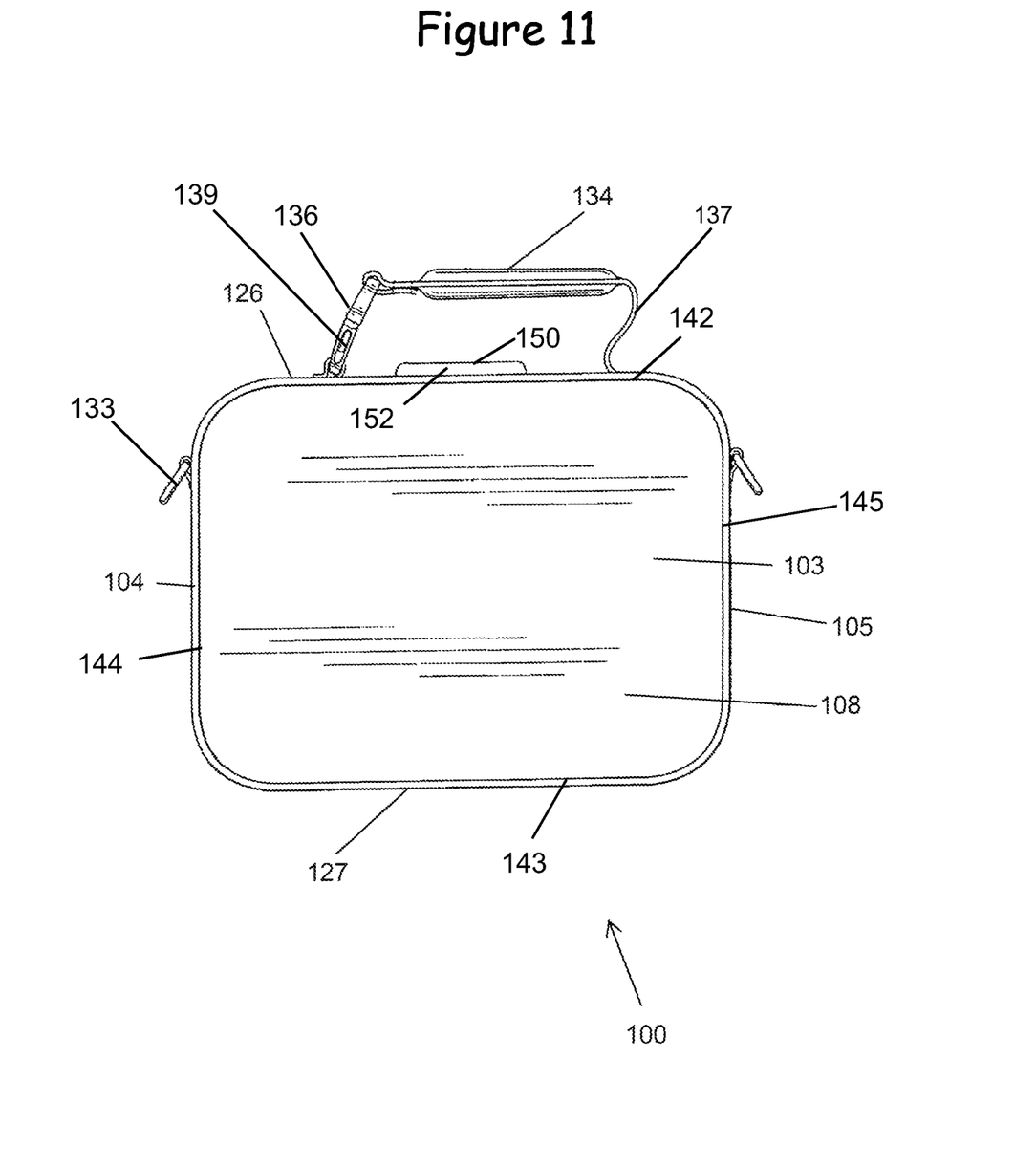
FIG. 11 is a bottom plan view of an insulated container of the container assembly having a handle and anchor attachments for a strap.
Figure 12:
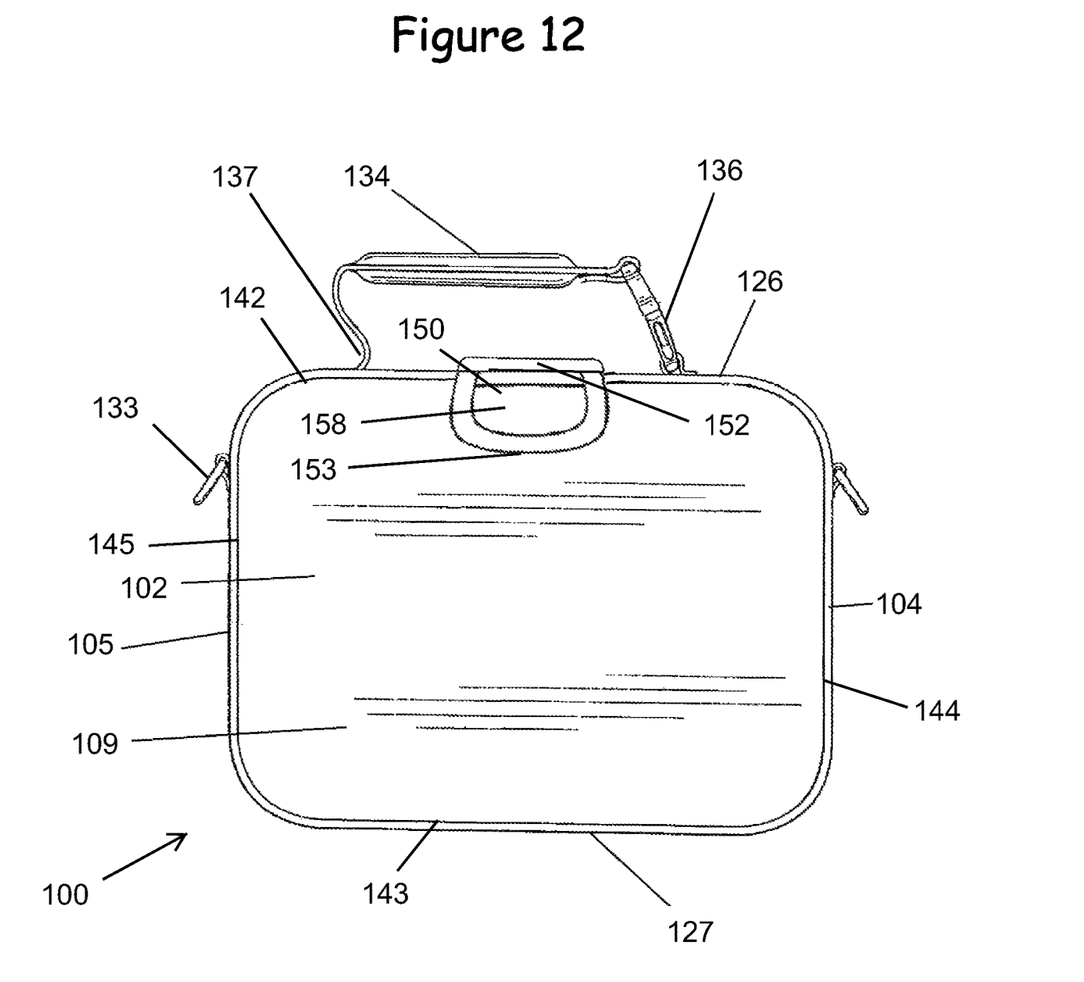
FIG. 12 is a top plan view of the insulated container of FIG. 11.

The insulated container 100 can further include a handle 134 for convenience, for example on front panel 106, as shown in FIGS. 11 and 12. The handle 136 can be attached at respective ends, such as right side 136 and left side 137 in the illustrated embodiments, and if desired it can include a reversible attachment 139. Attachment anchors 133 can alternatively or in addition be provided, in order to allow a carrying strap to be attached to the present container assembly. The insulated container 100 can also optionally include a flap 150 of flexible material to help secure the top panel to a wall of the insulated container, or can include other fasteners. Such a flap can include a reversibly securable joining mechanism, such as one half of a hook and loop fastener, on an inner surface 159 of the flap in order to secure it to the other fastener half attached to the container wall.

Expandable Insert

The expandable insert 200 is designed for use with expandable insulated containers 100, and is particularly preferred for use when the insulated containers 100 are soft-sided, i.e. made from flexible panels 101. The insert 200 fits within the interior compartment of the insulated container 100, which can be securely closed with the insert 100 inside it, and includes components made from both rigid and non-rigid materials. The rigid materials can be any rigid materials known to the art, but are preferably lightweight rigid polymer materials such as ABS (Acrylonitrile-Butadiene-Stryrene), polyester, or polyethylene terephthalate. The use of rigid materials helps to avoid crushing or other damage to objects carried within the insulated container portion. In the illustrated embodiments, the rigid portions of the inner surface 209 of the insert 200 is molded so as to accommodate the rounded sides of a beverage container, but other configurations can be used.

The insert 200 generally comprises a bottom end 203, right side 204, left side 205, front side 206, rear side 207, outer surface 208, inner surface 209, upper end 212, lower end 214, upper rigid container portion 220, a flexible medial portion 300, and a lower rigid container portion 240. For convenience, the upper end 212 of the insert 200 is open, but in some embodiments a top panel or other closure can be reversibly secured to the top of the insert 200, for example to form a fluid-tight seal around the upper end 212 of the insert 200. The upper rigid container portion 220 generally fits within the insulated container 100 in an unexpanded (i.e., smaller interior volume) configuration, and comprises a right side panel 224, left side panel 225, front panel 226, and rear panel 227. The upper end 232 of the upper rigid container portion 220 can be open or closed, as described above, while the lower end 234 is open.

Below the upper rigid container portion 220 is a lower rigid container portion 240 having a bottom panel 243, right side panel 244, left side panel 245, front panel 246, and rear panel 247. The upper end 252 is open, while the lower end 254 includes the bottom panel 243. The bottom panel 243 of the lower rigid container portion 240 is at the bottom 203 of the insert 200. In one embodiment, when the upper rigid container portion 220 is placed directly over the lower rigid container portion 240, the outer periphery of the lower rigid container portion 240 is contained within the outer periphery of the lower end 234 of the upper rigid container portion 220. Alternatively, when the upper rigid container portion 220 is placed directly over the lower rigid container portion 240, the outer periphery of the upper rigid container portion 220 can be contained within the inner periphery of the lower rigid container portion 240.

The upper rigid container portion 220 and lower rigid container portion 240 are joined by a flexible medial portion 300. The upper end 312 of the medial portion 300 is securely attached to the open lower end 234 of the upper rigid container portion 220, and the lower end 314 of the medial portion 300 is securely attached to the open upper end of the lower rigid container portion 240. The flexible medial portion 300 comprises a panel of flexible material, preferably an elastomeric material such as a thermoplastic elastomer (TPE) or thermoplastic rubber (TPR), for example silicone or styrene-butadiene-styrene (SBS). The flexible medial portion 300 can be joined to the upper rigid container portion 220 and lower rigid container portion 240 in ways known to the art, such as through double injection molding or an ultrasonic welding processes.

When the insert 200 is expanded so that the lower end 234 of the upper rigid container portion 220 is spaced away from the upper end 252 of the lower rigid container portion 240, as shown in FIGS. 4-7, the one or more panels of material of the flexible medial portion 300 serve to connect the upper rigid container portion 220 and lower rigid container portion 240, and also to contain food, beverage, or other items contained within the insert 200. In this configuration, rigidity of the material of the upper rigid container portion 220 and lower rigid container portion 240 continue to provide protection to items contained within the insert 200, while the flexible medial portion 300 allows the insert 200 to expand vertically in order to accommodate larger items or a larger number of items. When smaller or fewer items are contained within the insert 200, and/or when the insulated container 100 assumes a smaller-volume configuration, the flexible medial portion 300 can collapse and allow the upper rigid container portion 220 and lower rigid container portion 240 to come closer together, as shown in FIGS. 1a and 5a. The present insert 200 therefore provides a component that can protect the items stored in an insulated container 100 due to the use of the rigid portions of the insert 200 (the upper rigid container portion 220 and lower rigid container portion 240), while still allowing the insert 200 to be expanded when the insulated container 100 assumes a larger interior volume.

The examples set forth herein are provided to illustrate certain concepts of the disclosure. The apparatus, devices, or components illustrated above may be configured to perform one or more of the methods, features, or steps described herein. Those of ordinary skill in the art will comprehend that these are merely illustrative in nature, and other examples may fall within the scope of the disclosure and the appended claims. While the above descriptions contain many specific embodiments of the invention, these should not be construed as limitations on the scope of the invention, but rather as examples of specific embodiments thereof.

What is claimed is:

1. A container assembly, comprising:
an insulated container having an upper opening, an outer surface, an inner surface, an upper end, a lower end, and an interior space, wherein the container is formed from one or more flexible panels and comprises at least a top panel, a bottom panel, and one or more side panels, wherein the bottom panel and side panels are attached in order to form the interior space, and wherein the top panel is hingedly connected to at least one of the side panels at an upper end of the container and is reversibly securable to the remaining panels in order to close the container; and
an insert having an upper opening, an outer surface, an inner surface, an upper end, a lower end, and an interior space, wherein the insert comprises:
   an upper rigid container portion having an upper end and a lower end and comprising one or more rigid side panels;
   a lower rigid container portion having an upper end and a lower end and comprising one or more rigid side panels and a rigid bottom panel, wherein the bottom panel is attached to the lower ends of the one or more rigid side panels; and
   a circumferential flexible panel having an upper end and a lower end, wherein the lower end of the panel is attached to the upper end of the lower rigid container portion and the upper end of the panel is attached to the lower end of the upper rigid container portion,
wherein the insert is configured to be placed through the upper opening and contained within the interior space of the insulated container,
wherein, in a first configuration of the insert, the lower ends of the panels of the upper rigid container portion are below the upper ends of the panels of lower rigid container portion, and
wherein, in a second configuration of the insert, the lower ends of the panels of the upper rigid container portion are above the upper ends of the panels of lower rigid container portion, wherein the interior space of the insert in the second configuration is greater in volume than the interior space of the insert in the first configuration.

2. The container assembly of claim 1, further comprising a zipper connector which extends peripherally around the outer surface of the insulated container, wherein a first half of the zipper connector extends peripherally around a medial portion of the insulated container and a second half of the zipper connector extends peripherally around a lower end of the insulated container, and wherein the first and second halves of the zipper connector can be connected to form a first configuration of the insulated container or disconnected in order to form a second configuration of the insulated container, wherein the second configuration of the insulated container is able to contain the second configuration of the insert.

3. The container assembly of claim 1, wherein insert has an outwardly extending circumferential lip on the upper end of the upper rigid container portion.

4. The container assembly of claim 3, wherein the peripheral lip extends continuously around the periphery of the upper end of the upper rigid container portion.

5. The container assembly of claim 3, wherein each of the flexible panels comprises an outer layer and an inner layer, wherein the outer layer extends above the upper end of the inner layer, and wherein the peripheral lip is above the upper end of the inner layer.

6. The container assembly of claim 1, wherein the insulated container is cuboid in shape and comprises a right side panel, a left side panel, a front panel, and a rear panel, wherein the top panel is hingedly connected to the rear panel.

7. The container assembly of claim 6, wherein the insert is cuboid in shape, wherein the upper rigid container portion comprises a right side panel, a left side panel, a front panel, and a rear panel, and wherein the lower rigid container portion comprises a right side panel, a left side panel, a front panel, and a rear panel.

8. The container assembly of claim 1, wherein the side panels are cylindrical.

9. The container assembly of claim 1, wherein in the first configuration the panels of the upper rigid container portion are outside the panels of the lower rigid container portion.

10. The container assembly of claim 1, wherein the flexible panels are nylon.

11. The container assembly of claim 1, wherein the upper rigid container portion and the lower rigid container portion are made from an acrylonitrile-butadiene-styrene (ABS) or polyethylene polymer material.

12. The container assembly of claim 1, wherein the flexible panel is formed from silicone or styrene-butadiene-styrene (SBS).

13. The container assembly of claim 1, wherein the insulated container further comprises a handle or an attachment anchor for a strap.

14. The container assembly of claim 1, wherein the inner surface of the upper rigid container portion comprises concave surfaces for retaining drinks.

15. The container assembly of claim 1, wherein the top panel of the insulated container is reversibly securable to the remaining panels by a zipper connector.

* * * * *